United States Patent
Kienzle et al.

(10) Patent No.: US 7,886,266 B2
(45) Date of Patent: Feb. 8, 2011

(54) ROBUST PERSONALIZATION THROUGH BIASED REGULARIZATION

(75) Inventors: Wolf Kienzle, Besigheim (DE); Kumar H. Chellapilla, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1343 days.

(21) Appl. No.: 11/278,949

(22) Filed: Apr. 6, 2006

(65) Prior Publication Data

US 2007/0239450 A1 Oct. 11, 2007

(51) Int. Cl.
G06F 9/44 (2006.01)

(52) U.S. Cl. .................................................... 717/104

(58) Field of Classification Search ................ 707/7; 717/104
See application file for complete search history.

(56) References Cited

U.S. PATENT DOCUMENTS

| | | | | |
|---|---|---|---|---|
| 5,644,652 A * | 7/1997 | Bellegarda et al. | .......... | 382/186 |
| 5,680,480 A * | 10/1997 | Beernink et al. | ............ | 382/187 |
| 5,991,742 A * | 11/1999 | Tran | ........................... | 705/32 |
| 6,304,667 B1 * | 10/2001 | Reitano | ...................... | 382/187 |
| 6,725,199 B2 * | 4/2004 | Brittan et al. | ............... | 704/258 |
| 6,842,767 B1 * | 1/2005 | Partovi et al. | ............... | 709/203 |
| 6,842,877 B2 * | 1/2005 | Robarts et al. | .............. | 715/708 |
| 6,886,008 B2 * | 4/2005 | Blayvas et al. | .................... | 1/1 |
| 6,909,708 B1 * | 6/2005 | Krishnaswamy et al. | .... | 370/352 |
| 6,963,832 B2 * | 11/2005 | Vanhilst | ......................... | 704/9 |
| 7,239,731 B1 * | 7/2007 | Semenov et al. | ............ | 382/128 |
| 7,469,062 B2 * | 12/2008 | Napper | ....................... | 382/186 |
| 2004/0218232 A1 * | 11/2004 | Fishman | ..................... | 358/486 |
| 2005/0089227 A1 * | 4/2005 | Haluptzok et al. | .......... | 382/186 |
| 2005/0099398 A1 * | 5/2005 | Garside et al. | .............. | 345/173 |
| 2007/0140561 A1 * | 6/2007 | Abdulkader et al. | ........ | 382/187 |
| 2009/0263043 A1 * | 10/2009 | Cristobal Perez et al. | ... | 382/275 |

OTHER PUBLICATIONS

Bishop, C.; Nueral Networks for Pattern Recognition; Ocford; Clarendon Press; New York; Oxford University Press 1995; 495 pages.

B. Scholkopf, et al., A Generalized Representer Theorem, D. Helmbold and B. Williamson (Eds.): COLT/ EuroCOLT 2001, LNAI 2111, pp. 416-426, 2001. Springer-Verlag Berlin Heidelberg 2001; 10 pages.

W. Sarle, Neural Network FAQ, What is Weight Decay?, Topic: Weight decay for neural networks, May 17, 2002, Available at http://www.faqs.org/faqs/ai-faq/neural-nets/part3/section-6.html, last accessed Oct. 14, 2006, 2 pages.

C. Chang, et al., LIBSVM: A Library for Support Vector Machines, 2001. Available at http://www.csie.ntu.edu.tw/~cjin/libsvm; 22 pages.

(Continued)

*Primary Examiner*—Michael N Opsasnick
(74) *Attorney, Agent, or Firm*—Lee & Hayes, PLLC

(57) ABSTRACT

The subject disclosure pertains to systems and methods for personalization of a recognizer. In general, recognizers can be used to classify input data. During personalization, a recognizer is provided with samples specific to a user, entity or format to improve performance for the specific user, entity or format. Biased regularization can be utilized during personalization to maintain recognizer performance for non-user specific input. In one aspect, regularization can be biased to the original parameters of the recognizer, such that the recognizer is not modified excessively during personalization.

19 Claims, 10 Drawing Sheets

OTHER PUBLICATIONS

C. Hsu, et al., A Comparison on Methods for Multi-Class Support Vector Machines, IEEE Transactions on Neural Networks, Mar. 2002, vol. 13, No. 2, pp. 415-425; 11 pages.

W. Kienzle, et al., Training Support Vector Machines with Multiple Equality Constraints, in 16th European Conference on Machine Learning, J. Gama et al. (Eds.): ECML 2005, LNAI 3720, Springer-Verlag Berlin Heidelberg 2005, pp. 182-193; 12 pages.

Y. Lecun, et al., Gradient-Based Learning Applied to Document Recognition, Proceedings of the IEEE, Nov. 1998, vol. 86, No. 11, pp. 2278-2324; 47 pages.

H.A. Rowley, et al., The Effect of Large Training Set Sizes on Online Japanese Kanji and English Cursive Recognizers, Proceedings of the 8th International Workshop on Frontiers in Handwriting Recognition (IWFHR), 2002, 5 pages; 5 pages.

P.Y. Simard, et al., Best Practices for Convolutional Neural Networks Applied to Visual Document Analysis, Advances in Neural Information Processing Systems 12, 2000, 6 pages.

P. Sollich, Probabilistic Methods for Support Vector Machines, in Advances in Neural Information Processing Systems 12, S.A. Solla et al. (Eds.), 2000, MIT Press, pp. 349-355; 7 pages.

\* cited by examiner

ROBUST PERSONALIZATION THROUGH BIASED REGULARIZATION

BACKGROUND

Pattern recognition or classification of data generally consists obtaining raw input data and classifying the data based on a set of predefined categories or data patterns. Data classification can be used in a wide variety of contexts including handwriting recognition, voice recognition as well as interpretation of scanned of documents. While humans are very skillful at automatically resolving variations in raw data to classify data in standardized categories, machine interpretation and pattern recognition is a complex task. For example, an individual reading a handwritten note can usually identify words and characters despite variations and idiosyncrasies in the author's handwriting, while a computing machine may be unable to correctly interpret the input data.

Correct classification of data can be particularly important for computers, processors and the like. Frequently, raw input data must be classified using predefined categories such as data types before additional processing can take place. For example, English alphabet characters can be encoded using American Standard Code for Information Exchange (ASCII) or the Unicode standard prior to processing.

Certain types of raw data vary based upon both the entity providing the data and the instances of data provided by an entity. For example, each instance of handwritten characters provided by the same user will have small variations. Handwritten characters provided by different users will have larger variations based upon the varying styles of the authors. The larger variations between samples provided by various entities can make pattern recognition difficult even for humans.

One approach to pattern recognition has been to use machine learning systems to recognize data patterns such as alphanumeric characters. Typically, machine learning systems are trained using a large number of samples. If the raw data to be classified varies based upon the entity providing the samples (e.g., handwriting), samples can be provided by multiple users. This training set of samples can be used to generalize the machine learning system, such that the system can recognize input from new users from which the system has received no training data.

However, if the variations caused by the entity providing the samples are too large, recognition can difficult for a machine learning system however large and varied the set of training data. For example, each person's handwriting is so distinct that it can be used for identification purposes. As a result, learning from training data obtained from one set of users, even a large set of users, does not necessarily produce models that generalize well to new handwriting styles. Machine learning system recognition using a generic, writer independent recognizer can perform especially poorly for users with rare writing styles. Similarly, large variations in samples provided by different entities can make data classification difficult for generically trained machine learning systems in other contexts. For example, variations in accent, dialect and enunciation of users complicate voice recognition.

SUMMARY

The following presents a simplified summary in order to provide a basic understanding of some aspects of the claimed subject matter. This summary is not an extensive overview. It is not intended to identify key or critical elements or to delineate the scope of the claimed subject matter. Its sole purpose is to present some concepts in a simplified form as a prelude to the more detailed description that is presented later.

Briefly described, the provided subject matter concerns the personalization of a recognizer. Recognizers are typically used to classify raw input data. For example, a recognizer can be used to classify handwritten characters and generate corresponding alphanumeric characters. Recognizers can be implemented using machine learning systems and are usually trained using numerous samples from multiple sources prior to installation and operation. This training results in a generic recognizer including a base set of parameters. To improve performance of a recognizer for a specific individual or entity, the recognizer can be personalized using samples particular to the individual or entity. For example, for a recognizer that analyzes handwriting, a user can provide customized samples consisting of a set of characters handwritten by the user. During personalization, the base parameters of the recognizer are updated based upon the customized samples to enhance performance of the recognizer for input data provided by the user. However, this specialization can reduce recognizer performance for non-user specific input data.

Personalization can be performed using regularization biased towards the base parameters of the recognizer to limit the effects of personalization on performance of the recognizer over non-user specific input data. Biased regularization can be used to prevent the parameters from changing dramatically. Excessive modifications to the base parameters of the recognizer can reduce performance for input from other individuals. In addition, biased regularization prevents the recognizer from being skewed by an atypical or erroneous sample provided by the user.

In one aspect, biased regularization can be based on the deviation between the base parameters and the updated parameters of the recognizer as well as the error rate over the set of customized samples. During biased regularization, the sum of the deviation from the parameters and error rate over the set of customized samples can be minimized to determine the updated set of parameters. This ensures that performance is enhanced for the specific user or entity while minimizing deviation from the base set of parameters.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Figure 1:
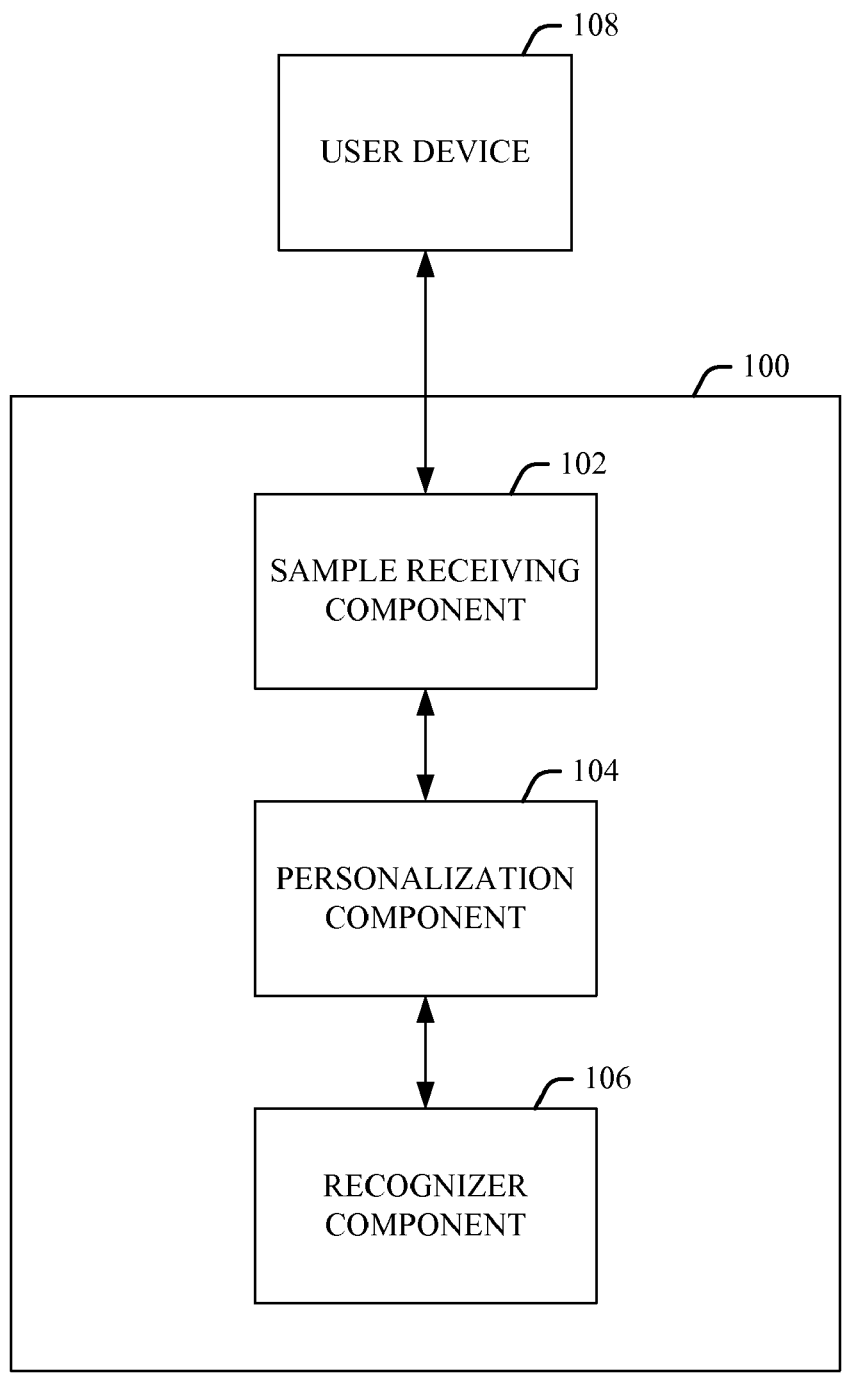
FIG. 1 is a block diagram of a system for performing personalization of a recognizer in accordance with an aspect of the subject matter disclosed herein.

The various aspects of the disclosed subject matter are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The word "exemplary" is used herein to mean serving as an example, instance, or illustration. The subject matter disclosed herein is not limited by such examples. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

One approach to improving recognizer performance over samples from previously unknown users or entities is customization or personalization. Personalization enables a recognizer to adapt to samples generated or collected by a particular user or entity. The terms personalization and customization are used interchangeably herein. A generic recognizer trained on a large number of samples from several users or entities is referred to herein as a base recognizer. Adaptation of a base recognizer using a number of samples from a particular user or device is referred to as personalization. Frequently, base recognizers can be distributed and installed before being personalized or tuned for a specific user or owner to reduce the error rate on input data particular to that user. Consequently, if a million copies of the base recognizer are distributed and installed, a million different individualized or personalized recognizers can be created.

However, there is a trade-off between the number of customized samples needed to train the recognizer, the reduction in error rate due to additional samples and the perceived inconvenience to the user of generating additional samples. In general, the larger amount of customized training data, the better the personalized recognizer, but the more inconvenienced the user. For example, in the context of handwriting recognition, users submit samples of handwriting with characters properly labeled to enable personalization of the recognizer based upon the customized samples. Generation of labeled, customized samples can be both time-consuming and tedious for the user. It is important to find the balance for the number of samples that provides users with sufficient performance without requiring excessive amounts of user time or effort during personalization. In general, the first few customized samples provide the greatest reduction in the error rate for a recognizer and the least inconvenience to a user.

Unfortunately, personalizing a recognizer can reduce the performance of the recognizer on input not generated by the user for whom the recognizer has been personalized. In general, the sample training data is not provided to users with the recognizer due to the large size of the set of training data. Accordingly, when the base recognizer is personalized, the base recognizer is modified from its initial state based upon samples provided solely by the user. Consequently, a small set of customized samples can have a disproportionate effect upon parameters of the recognizer. If the recognizer is to be used solely by a single user, this may be acceptable or unimportant. However, if the recognizer is shared among multiple users the error rate can be excessive for other users. For example, a family computer including a graphics tablet that is capable of recognizing handwritten characters can be shared among four different users. If the recognizer associated with the graphics tablet is personalized by the youngest child, the performance of the recognizer and therefore the graphics tablet can be worse for the other members of the household than if the recognizer had not been personalized at all.

Personalization of recognizers can be constrained to optimize recognizer performance for an individual user while bounding the possible decline in performance for other users. Additionally, if a user submits an incorrectly labeled sample, a distorted sample or simply too few samples, bounding the variation of the recognizer can prevent the recognizer from becoming overly personalized based on a bad sample. Limiting modification of the parameters of the recognizer can prevent customized samples from having a disproportionate effect upon the overall performance of the recognizer.

Personalization can be optimized using regularization biased to parameters of the base recognizer. Training the recognizer using regularization biased to the base recognizer limits the amount of change from the base recognizer to the personalized recognizer. Biased regularization effectively trades off between the amount of change allowed to the base recognizer versus the improvement in the error rate for the particular user for whom the recognizer is personalized.

Recognizers are described in detail herein with respect to an exemplary handwriting recognizer. However, the systems and methods described are not limited to handwriting recognition. The systems and methods are applicable to any context in which a recognizer is personalized for an individual user, device or format, including, but not limited to voice recognition and recognition of printed text.

Referring now to FIG. 1, a system 100 for personalizing a recognizer is illustrated. The system 100 can include a sample receiving component 102, a personalization component 104 and a recognizer component 106. The sample receiving component 102 can receive a set of one or more customized or personalized samples from a user device or client device 108. The customized samples can be used by the personalization component 104 during personalization of the recognizer component 106.

The input samples can be received in any format suitable for the sample receiving component 102. The sample receiving component 102 can format the input samples prior to personalization using the samples. The customized samples can include raw input data as well as the corresponding classification or category to be generated by the recognizer when processing the customized sample. The classification for raw data can also be referred to as the label for the data. For a recognizer performing handwriting recognition, customized samples can include a set of handwritten characters and a set of ASCII characters labels that correspond to each of the handwritten characters.

In addition, the personalization process can be used to add new labels to the set of labels or categories recognized by the recognizer. Recognizers include a set of recognized labels that can be specific to the purpose or function of the recognizer. For example, it is unlikely that an English language recognizer would include accented characters such as 'è' in the set of recognized labels. Consequently, the English recognizer would likely identify the raw input 'è', which appears in languages such as French and Italian, as an unaccented 'e'. However, a French recognizer given the same raw input would most likely correctly identify an 'è'. This problem can be particularly evident in Asian languages containing numerous characters. For example, the recognized labels of a Chinese recognizer can be encoded using the Unicode standard, which supports virtually all known Chinese characters, but the recognized labels can include only a fraction of the known characters due to limitations in obtaining training samples and the sheer number of characters. During personalization, raw input and a new label can be used to personalize the recognizer and add a new label to the set of recognized labels. In this manner, additional labels can be included as needed. Similarly, new words can be added to a voice recognition system using the same techniques.

The sample receiving component 102 can include a graphical user interface (GUI). The GUI can prompt a user to enter raw input data and corresponding classifications or labels. The sample receiving component 102 can require a minimum number or type of customized samples. To obtain these samples, the GUI can prompt users to enter a specific number or variety of customized samples to perform personalization. The user device 108 can include any type of device or devices for inputting raw data and labels. For example, for a system performing handwriting recognition, the user device 108 can include a touch screen and stylus for entering handwritten data as well as a keyboard to generate the corresponding labels.

The GUI of the sample receiving component 102 can also provide users with the ability to opt out of biased regularization. Certain users may prefer to optimize performance for the individual user regardless of the effect upon performance of the recognizer component 106 for non-user specific input. For example, a single owner of a user device such as a tablet personal computer (PC) can decide that as the sole user, the device should be optimized for the owner's performance regardless of any increase in error rate for data input by another user.

The personalization component 104 can update the recognizer component 106 based not only on the samples received at the sample receiving component 102, but also based upon the initial state or parameters of the recognizer component 106. In particular, the personalization component 104 can use regularization biased to the initial or base parameters of the recognizer component 106 to update the parameters of the recognizer component 106.

Figure 2:
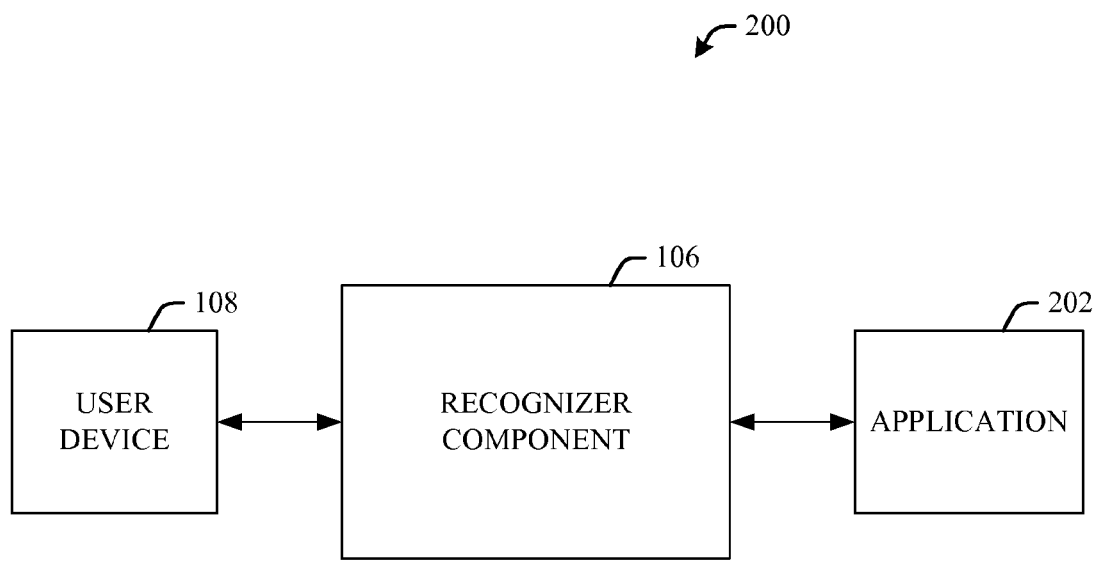
FIG. 2 is a block diagram of a system for performing pattern recognition utilizing a personalized recognizer in accordance with an aspect of the subject matter disclosed herein.

Referring now to FIG. 2, a system 200 for performing pattern recognition using a personalized recognizer is illustrated. The system 200 includes a user device 108 that provides raw data to a recognizer component 106. The recognizer component 106 can be personalized for a specific user or entity. The recognizer component 106 can analyze the raw data and generate a set of labels that correspond to the raw data. The labels can be provided to an application 202. The data can be formatted such that the application 202 can manipulate and process the data. For example, handwritten data can be analyzed to generate a set of ASCII labels. Alternatively, the recognizer component 106 can return the set of labels to the user device 108, where the user device 108 can display the labels for review and approval by a user.

The user device 108 can be any device that collects, generates or receives raw data. In an aspect, the user device 108 can generate image data. For example, the user device 108 can be a tablet (PC), graphics tablet or other touch screen device. Users can write or draw directly onto the screen using a stylus, pointer or other input device and the resulting image data can be transmitted to the recognizer component 106. Alternatively, the user device 108 can include an image scanner that analyzes input such as printed text or handwriting and converts the input into image data. The image data can be transmitted to the recognizer component 106. Alternatively, the user device 108 can generate or collect audio data. For example, the user device 108 can include a voice recorder used to produce an audio data file. This raw audio data can be analyzed by the recognizer component 106 to generate word labels.

The application 202 can include any software application or device for processing label data, such as a word-processing application. In addition, the recognizer component 106 can generate command labels based upon the raw data, whether image or audio data. Command labels can be interpreted as commands for the application 202. For example, for a system 200 performing voice recognition certain words such as "start," "stop" and "delete" can be interpreted as commands for an application 202.

The recognizer component 106 can be implemented using a machine learning system based recognizer or statistical recognizer. Possible systems include, but are not limited to, linear classifiers, logistic regression, neural networks and support vector machines. The recognizer component 106 can be trained on a large number of samples provided by multiple users or devices prior to installation in system 200.

Figure 3:
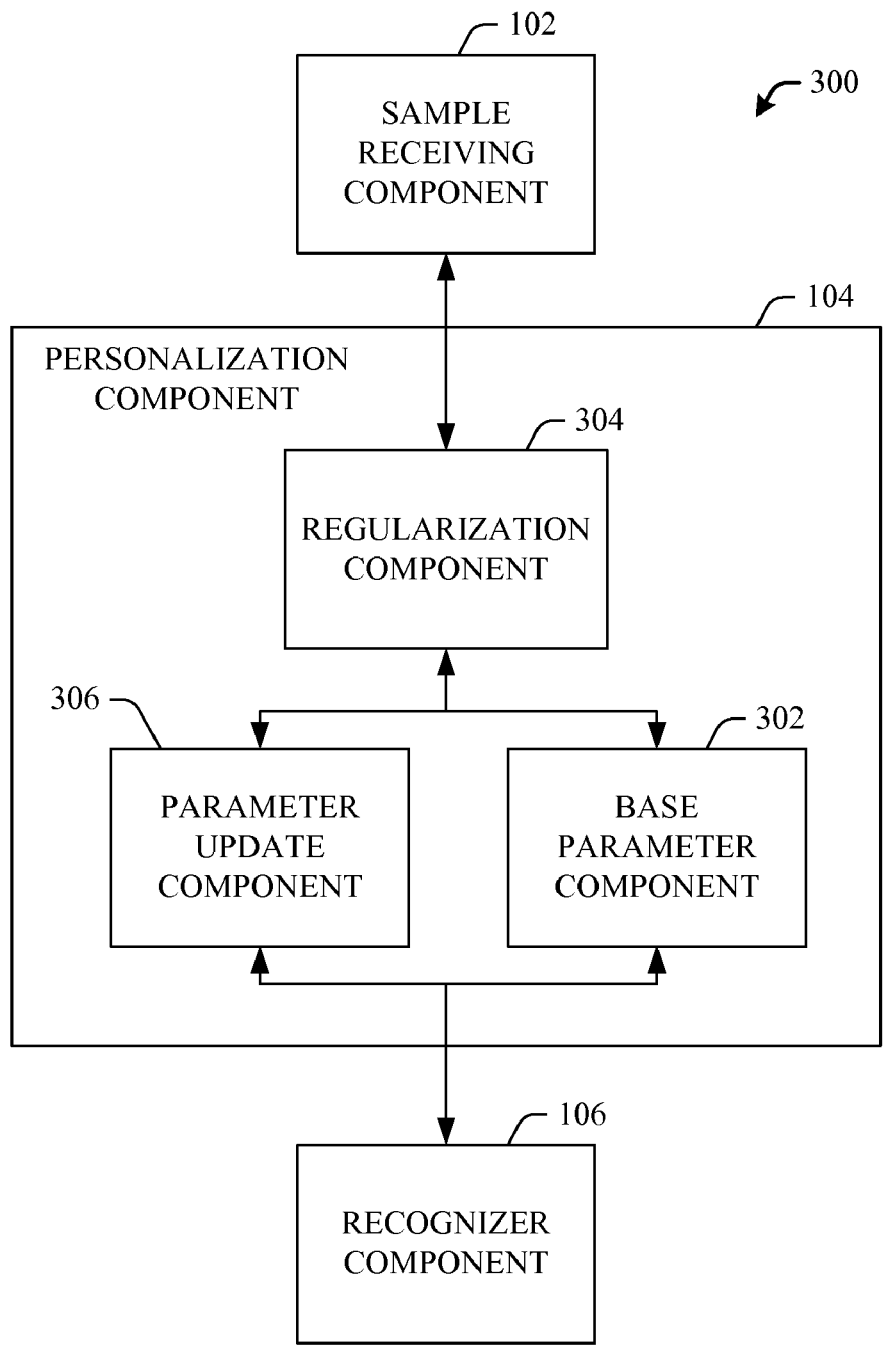
FIG. 3 is a block diagram of a system for performing personalization of a recognizer utilizing regularization in accordance with an aspect of the subject matter disclosed herein.

Referring now to FIG. 3, a system 300 for personalizing a recognizer is illustrated. The system includes a sample receiving component 102, a recognizer component 106 and a personalization component 104. The sample receiving component 102 receives or obtains one or more customized samples specific to a particular user, device or format. The recognizer component 106 receives raw input data and identifies patterns to generate labels as discussed in detail supra. The personalization component 104 adapts the recognizer component 106 based at least in part upon the customized samples obtained by the sample receiving component 102.

The personalization component 104 can include a base parameter component 302 that obtains the base parameters of the recognizer component 106 to be used during personalization. The base parameters can be maintained by the personalization component 104 and retrieved prior to personalization. The original base parameters of the recognizer component 106, which are the parameters prior to any personalization of the recognizer component 106, can be maintained and used multiple times if personalization can be performed more than once. For example, if a user is not satisfied with performance after an initial set of samples is input, the user may elect to perform personalization using additional samples. Alternatively, the base parameters maintained by the personalization component 104 can be updated when personalization is performed to reflect the results of personalization. In another aspect, the base parameter component 302 can obtain the base parameters directly from the recognizer component 106. In this case, the base parameters will update based upon personalization. Any further personalizations will utilize the updated base parameters. In this case, the amount of change will be limited each time personalization is performed, but successive personalizations could increase the total change from the original base set of parameters.

In addition, the personalization component 104 can include a regularization component 304. The regularization component 304 utilizes regularization to adapt or modify the recognizer component 106 using the samples. In general, regularization can be used to control the number of parameters used by a recognizer component 106. Regularization can be used to trade off the complexity of the recognizer component 106 with recognition performance. For example, if not enough parameters are used in the recognizer component 106, the recognizer component 106 will not be powerful enough to learn to identify complex patterns. However, if an excessive number of parameters is utilized the recognizer component 106 will become brittle, requiring large amounts of training data; effectively memorizing specific samples rather than learning from the samples. However, regularization can also be used to bias the parameters of the recognizer component 106 to the base parameters of the recognizer component 106, preventing the recognizer component 106 from changing drastically in response to the customized samples. The process of regularization will be discussed in detail infra.

The personalization component 104 can also include a parameter update component 306 that adapts or modifies the parameters of the recognizer component 106. The parameter update component 306 can update the parameters multiple times during training. Once the recognizer component 106 is retrained based upon the customized samples, the parameters can be frozen or fixed for operation of the recognizer component 106.

Figure 4:
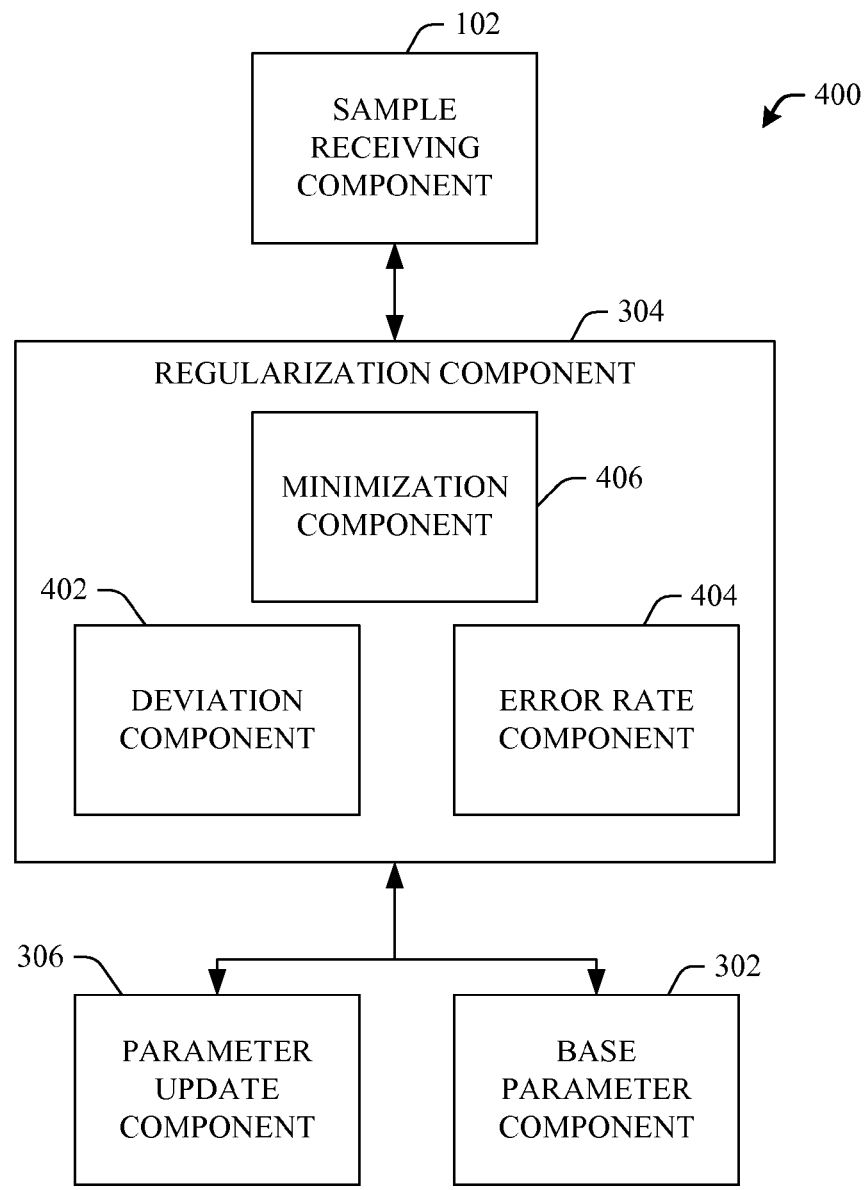
FIG. 4 is a block diagram of a system for performing personalization of a recognizer utilizing biased regularization in accordance with an aspect of the subject matter disclosed herein.

Referring now to FIG. 4, a system 400 for performing personalization of a recognizer utilizing biased regularization is illustrated. Regularization can be used to bias the training, such that changes to the parameters of the recognizer are bounded or limited. Here, it is desired that the parameters of the personalized recognizer component remain similar to the parameters of the base recognizer. Preventing the parameters of the recognizer component from varying too dramatically from those of the base recognizer ensures that the recognizer component will retain adequate performance for general or non-user specific input data.

If regularization is not used, recognizers are generally trained to minimize risk of errors. For example, for a recognizer, f, performing handwriting recognition, the recognizer takes an input character x and outputs a character label y. Here, y is a function of the input character x and the recognizer parameters, w. Therefore, y can be written as f(x;w). Given a number of sample pairs (x, y), where m is the number of samples. The risk can be represented as the sum of individual losses over the input data samples as follows:

$$R(f) = \frac{1}{m} \sum_{i=1}^{m} L(f(x_i), y_i)$$

Here, L is a loss function indicative of errors in recognition, such as least squares. Least squares loss can be represented as follows:

$$L(f(x_i), y_i) = (y_i - f(x_i))^2$$

Here, the loss function is based upon errors between the labels generated by the recognizer, represented as $f(x_i)$, and the character labels from the input samples, represented as $y_i$. Any suitable loss function can be used (e.g., cross entropy or hinge loss). In the absence of regularization, training the recognizer would likely be done by directly minimizing the risk, R. Because the recognizer is updated using only the customized samples rather than a full, general set of training data, the resulting personalized recognizer component is likely to perform poorly for non-customized data.

The loss function can be selected to reflect the relative importance of samples. Recognition errors are unlikely to be evenly distributed across all samples. For example, in the English language, there are specific groups of symbols that are similar in appearance and are therefore that are likely to be confused, such as numeral zero, letter 'O' or capital 'Q' and numeral one, letter 'l' or symbol '|'. In contrast, symbols 'A', 'B' or 'Z' are more distinctive and unlikely to be mistaken for each other. The loss function can be selected to take into account a non-uniform distribution of errors during the personalization process. Consequently, certain samples can be more heavily weighted than others.

If unbiased regularization is utilized, instead of directly minimizing the risk R, a weighted sum of the risk and the recognizer complexity can be minimized. Tichonov regularization is an exemplary regularization function shown below. However, any number of different regularization formulas can be utilized. Recognizer complexity can be calculated based upon the norm of the recognizer parameters, $\|w\|$. Regularization used to minimize recognizer complexity while balancing risk of loss can be represented as follows:

$$\min \left[ \|w\|^2 + C \sum_{i=1}^{m} L(w^T x_i, y_i) \right]$$

Here, the regularization term representing recognizer complexity, $\|w\|^2$, can be viewed as a penalty on complex recognizer structures. In other words, Tichonov regularization biases the recognizer solution toward the origin.

However, by biasing regularization toward the base set of parameters of the recognizer component, variation from the base recognizer during personalization can be limited. Regularization biased toward the base parameters can be represented as follows:

$$\min\left[\|w - w_0\|^2 + C\sum_{i=1}^{m} L(w^T x_i, y_i)\right]$$

Here, regularization is biased to the base set of parameters, $w_0$, rather than to the origin. A penalty is created for making large or dramatic changes to the base recognizer component during personalization. The constant, C, can be selected to determine the trade off between deviation from the base parameters versus risk of loss for over customized samples.

Biased regularization can be applied to a variety of machine learning systems or statistical recognizers, such as linear classifiers, logistic regression, neural networks, support vector machines and the like. Linear classifiers and kernel based classifiers such as support vector machines can directly optimize the regularization function shown above. Accordingly, biased regularization can be directly applied to recognizers implemented using these classes of models. However, biased regularization can also be utilized for neural networks. Neural networks typically employ regularization using weight decay. In general, weight decay is a type of regularization used by neural networks to add a penalty term to the error function. This causes the weights used by a neural network to converge to smaller absolute values than they otherwise would. The weight decay update rule can be extended to incorporate biased regularization.

Looking now at FIG. 4, a regularization component 304 can include a deviation component 402 that generates a deviation score representing change from the base parameters of the recognizer. Deviation of a new set of parameters, w, from the base parameters, $w_0$, can be generated using the norm of the difference between the parameter sets as follows:

$$\|w - w_0\|^2$$

However, generation of parameter deviation is not limited to this exemplary equation. For example, a non-Euclidian norm could be utilized. In addition, the norm could be cubed rather than squared. A wide variety of equations could be used to generate a score that reflects the deviation of a proposed set of parameters from the base parameters.

In addition, the training component 304 can include an error rate component 404. The error rate or risk can be calculated as follows $$C\sum_{i=1}^{m} L(w^T x_i, y_i)$$

Here, the sum of the loss over the set of customized samples, m, using the new set of parameters, w, is multiplied by a constant C.

Finally, the training component 304 can include a minimizer component 406. The minimizer component 406 utilizes the scores generated by the error rate component 404 and the deviation component 402 to determine an optimal set of updated parameters for the recognizer. Minimization of deviation and error rate can be represented as follows:

$$\min\left[\|w - w_0\|^2 + C\sum_{i=1}^{m} L(w^T x_i, y_i)\right]$$

The aforementioned systems have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Additionally, it should be noted that one or more components may be combined into a single component providing aggregate functionality or divided into several sub-components. The components may also interact with one or more other components not specifically described herein but known by those of skill in the art.

Furthermore, as will be appreciated various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent.

In view of the exemplary systems described supra, methodologies that may be implemented in accordance with the disclosed subject matter will be better appreciated with reference to the flowcharts of FIGS. 5-8. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, carrier, or media.

Figure 5:
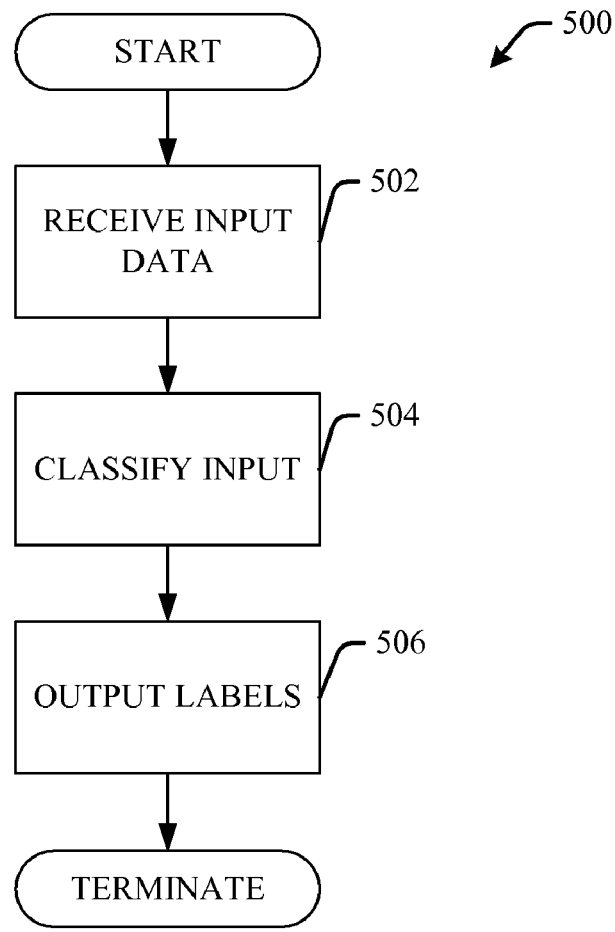
FIG. 5 illustrates a method for classifying input data in accordance with an aspect of the subject matter disclosed herein.

Referring now to FIG. 5, a methodology 500 for classifying input data is illustrated. At 502, a recognizer receives input data. The input data can include any form of data that can be processed and classified into a predefined classification system. For example, input data can include image data, including input from a touch screen device or an image file, such as a scanned image. In addition, input data can include audio data, which can be used for speech recognition. However, audio data recognition is not limited to voice recognition. For example, hydrophone data can be analyzed to identify specific vessels or marine life. At 504, the raw input data is processed and one or more labels corresponding to standardized classifications are generated. For example, if the input data includes images of handwritten English documents, the input data can be classified based upon the English alphanumeric symbols. The recognizer can be trained in a wide range of alphabets (e.g., Japanese, Greek and Russian) and sets of symbols. Once labels are generated, the labels can be transmitted to a user interface or other application at 506. For example, in the case of handwritten documents, the characters can be displayed on a user interface to allow the user to review and correct the generated labels.

In addition, the generated labels can be utilized by a variety of software applications. For example, handwritten input can be classified as ASCII characters, which can be utilized by a variety of word-processing applications. Similarly, voice input can be classified as a set of words. The words can be interpreted as application specific commands or can be represented as ASCII characters and utilized by a word-processing application.

Figure 6:
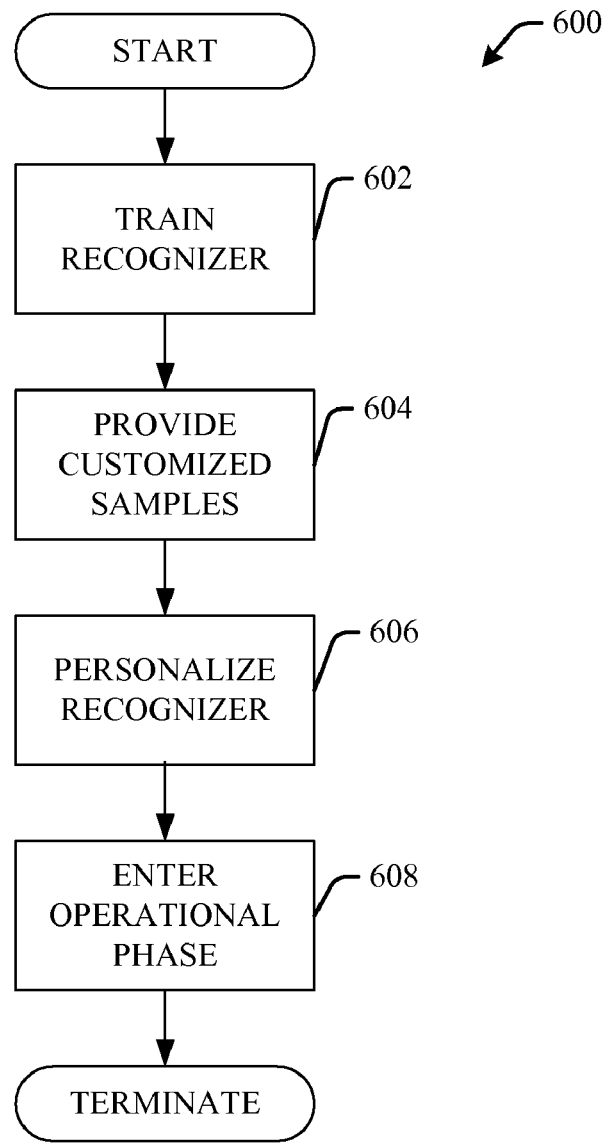
FIG. 6 illustrates a method for generating a personalized recognizer in accordance with an aspect of the subject matter disclosed herein.

Referring now to FIG. 6, a methodology 600 for generating a personalized or customized recognizer is illustrated. At 602, a recognizer is trained utilizing user independent data. For example, recognizers can be trained at the vendor's facilities using large data sets with numerous samples from multiple sources. The trained recognizers can be sold or distributed to a variety of users. However, as discussed supra due to idiosyncrasies of users, training on user independent data may not lead to adequate results for all users. Accordingly, users can elect or can be required to personalize the recognizer.

At 604, one or more customized samples are provided. The customized samples can be specific to the desired user, format or client device that will be utilized with the recognizer. Generally, the customized samples are specific to an individual user (e.g., the user's handwriting or voice). However, customization is not necessarily specific to a person. For example, the input samples can be printed text. In which case, customized samples can be text printed using a font on which the recognizer has not been trained. Over the years, fonts and typefaces go in and out of fashion. A recognizer can be customized to provide to recognize a new font or typeface.

After the customized samples have been received or obtained, the recognizer can be customized at 606. Personalization or customization can be based upon the received customized samples as well as the original parameters of the recognizer. Typically, the original training data is not available during personalization. Due to the large volume of data required to train the recognizer initially, vendors do not generally provide the data with the recognizer. Once personalization is complete, the parameters can be fixed and the recognizer can enter into a normal operational phase at 608.

Figure 7:
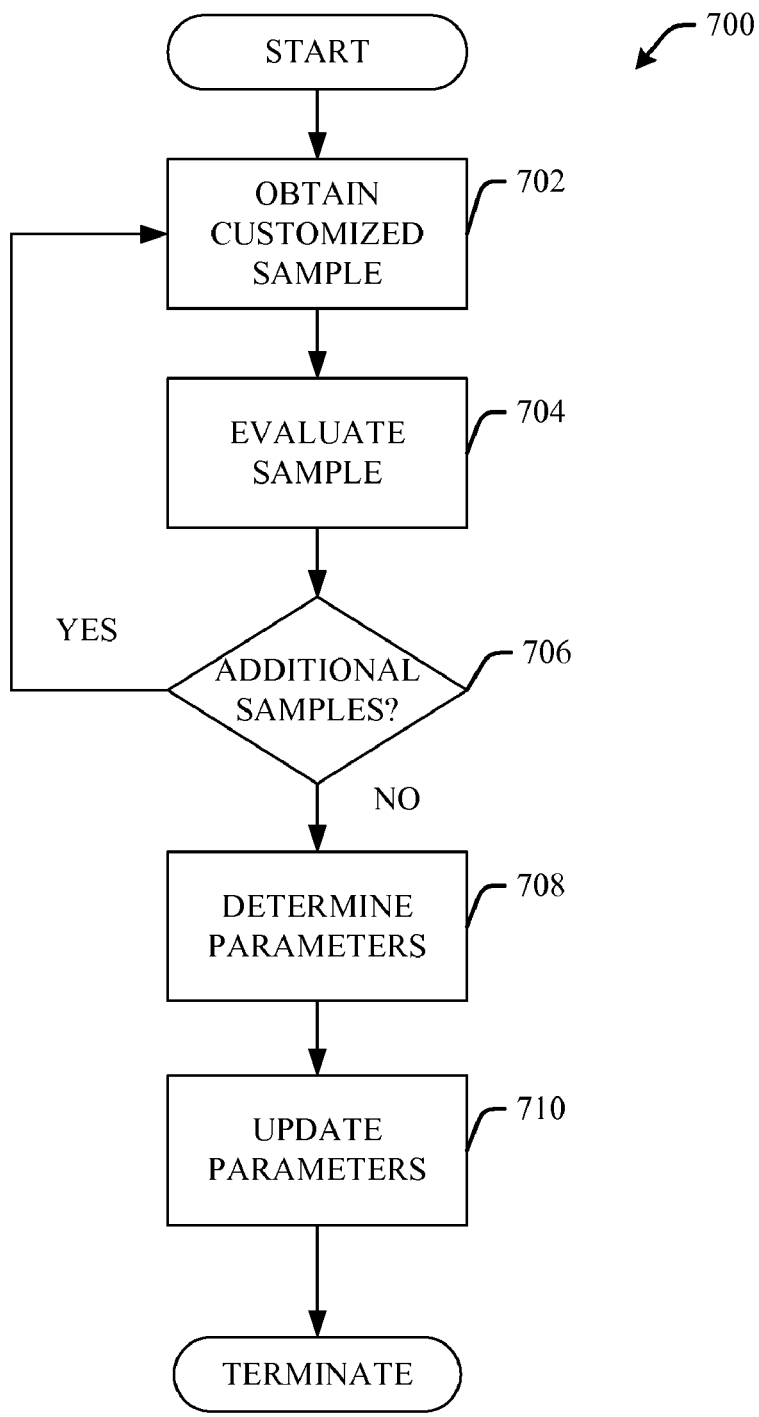
FIG. 7 illustrates a method for personalizing a recognizer in accordance with an aspect of the subject matter disclosed herein.

Referring now to FIG. 7, a methodology 700 for personalizing a recognizer is illustrated. At 702, a customized sample is obtained. The customized sample can include raw input data for evaluation by the recognizer as well as a label that indicates the classification that should be generated by the recognizer for the sample. For handwriting analysis, an input sample can include a handwritten character and the label indicating the letter of the alphabet represented by the handwritten character. The raw input data from the customized sample is evaluated and compared to the label at 704. At 706, a determination is made as to whether there are additional customized samples to process. If yes, a new customized sample is obtained at 702. If no, parameters for the recognizer are determined using regularization biased to the base parameters of the recognizer at 708. Once the parameters have been determined, the recognizer can be updated at 710.

The recognizer can be personalized using batch personalization as described above or using iterative personalization. During batch personalization a collection of samples are obtained and the base parameters of the recognizer are updated a single time using the collection of samples. During iterative or online personalization, the recognizer parameters can be updated as samples are received. Typically, updating the recognizer takes significantly less time than inputting samples. Consequently, the recognizer can be personalized in between entry or receipt of each sample.

Figure 8:
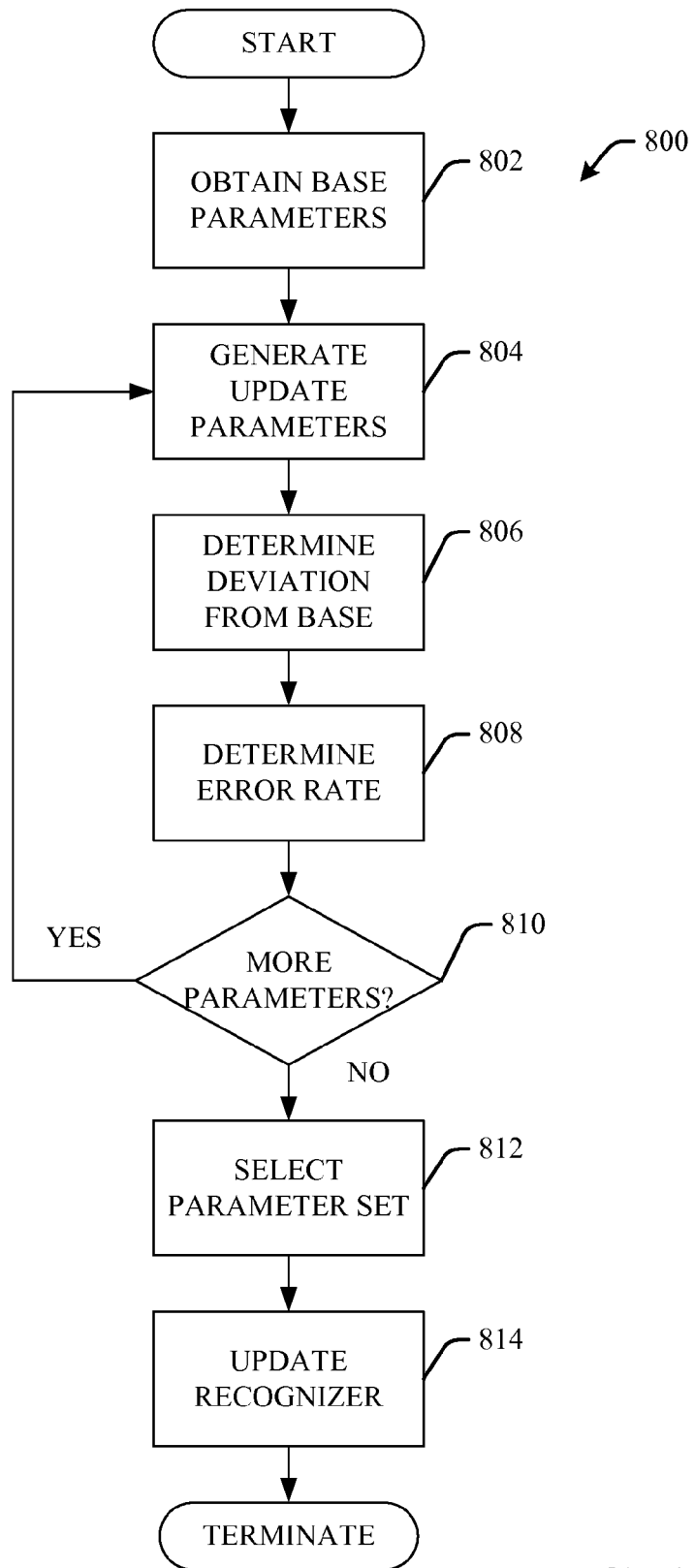
FIG. 8 illustrates a method for personalizing a recognizer using biased regularization in accordance with an aspect of the subject matter disclosed herein.

Referring now to FIG. 8, a methodology 800 for performing personalization of a recognizer using biased regularization is illustrated. At 802, the base parameters of the recognizer can be obtained. As discussed supra, the base parameters can be maintained in a data store or retrieved from the recognizer. In addition, the base parameters can be the original parameters of the recognizer or parameters updated during a previous personalization. At 804, a set of updated parameters is generated.

The deviation of the updated parameters from the base parameters of the recognizer can be calculated at 806. The deviation can be calculated by computing the change in the set of parameters. For example, the deviation can be calculated as the mean-squared differences between the updated parameters and the base parameters. However, any measurement of change between the sets of parameters can be utilized. At 808, an error rate over the set of customized samples is determined for the recognizer utilizing the new set of possible parameters. As discussed supra, any suitable loss function can be used to determine the error rate or risk for the customized input samples. The error rate can be computed as the sum of the individual losses over the samples, divided by the number of samples.

At 810, a determination is made as to whether there are additional updated parameter sets to evaluate. If yes, the process returns to 804. If no, a set of parameters is selected from the possible updated parameters to minimize the regularization function based upon the error rate and deviation at 810. At 812, the parameters of the recognizer are updated to the selected parameters.

Figure 9:
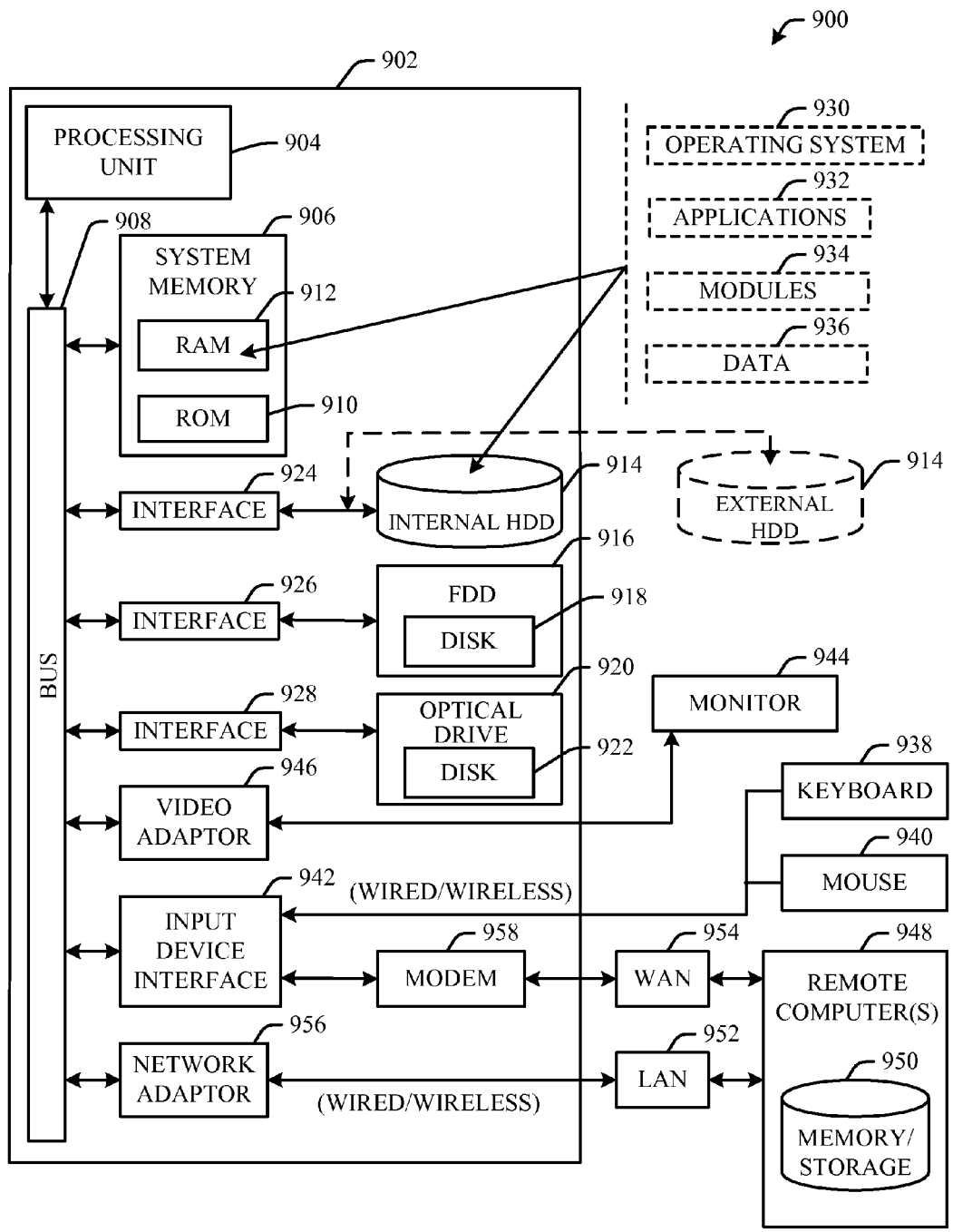
FIG. 9 is a schematic block diagram illustrating a suitable operating environment.
Figure 10:
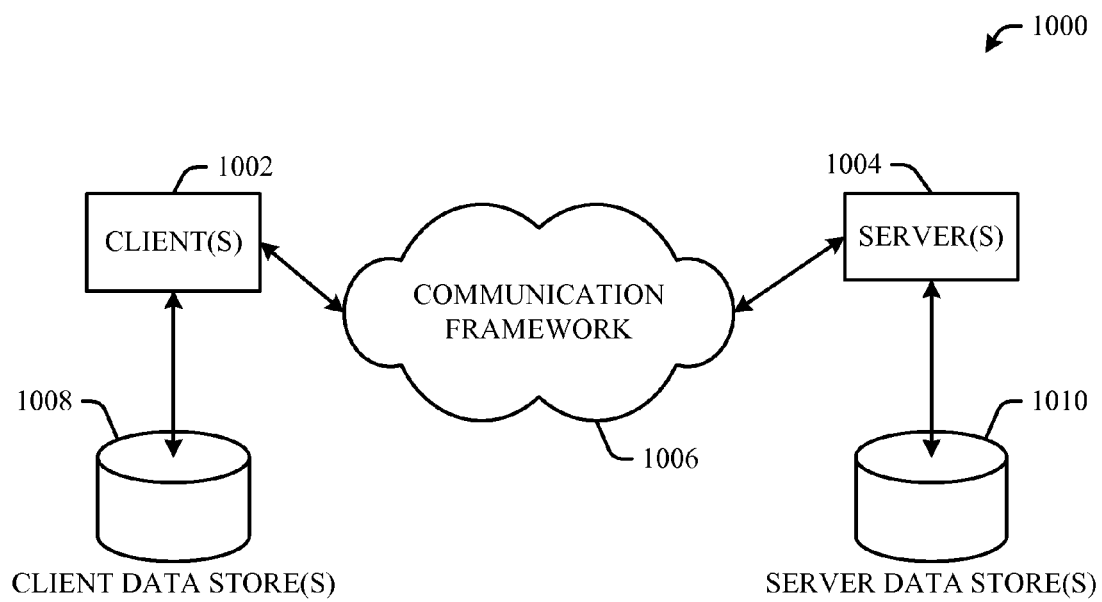
FIG. 10 is a schematic block diagram of a sample-computing environment.

In order to provide a context for the various aspects of the disclosed subject matter, FIGS. 9 and 10 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the systems and methods disclosed herein also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, minicomputing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects disclosed herein can be practiced on standalone computers. In a distributed computing environment, program modules may be located in both local and remote memory storage devices.

With reference again to FIG. 9, the exemplary environment 900 for implementing various aspects of the embodiments includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read-only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 may also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies. Other external drive connection technologies are within contemplation of the subject systems and methods.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods for the embodiments of the data management system described herein.

A number of program modules can be stored in the drives and RAM 912, including an operating system 930, one or more application programs 932, other program modules 934 and program data 936. All or portions of the operating system, applications, modules, and/or data can also be cached in the RAM 912. It is appreciated that the systems and methods can be implemented with various commercially available operating systems or combinations of operating systems.

A user can enter commands and information into the computer 902 through one or more wired/wireless input devices, e.g., a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc.

A monitor 944 or other type of display device is also connected to the system bus 908 via an interface, such as a video adapter 946. In addition to the monitor 944, a computer typically includes other peripheral output devices (not shown), such as speakers, printers, etc.

The computer 902 may operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which may connect to a global communications network, e.g., the Internet.

When used in a LAN networking environment, the computer 902 is connected to the local network 952 through a wired and/or wireless communication network interface or adapter 956. The adaptor 956 may facilitate wired or wireless communication to the LAN 952, which may also include a wireless access point disposed thereon for communicating with the wireless adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 via the serial port interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out, anywhere within the range of a base station. Wi-Fi networks use radio technologies called IEEE 802.11(a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

FIG. 10 is a schematic block diagram of a sample-computing environment 1000 with which the systems and methods disclosed herein can interact. The system 1000 includes one or more client(s) 1002. The client(s) 1002 can be hardware and/or software (e.g., threads, processes, computing devices). The system 1000 also includes one or more server(s) 1004. Thus, system 1000 can correspond to a two-tier client server model or a multi-tier model (e.g., client, middle tier server, data server), amongst other models. The server(s) 1004 can also be hardware and/or software (e.g., threads, processes, computing devices). One possible communication between a client 1002 and a server 1004 may be in the form of a data packet adapted to be transmitted between two or more computer processes. The system 1000 includes a communication framework 1006 that can be employed to facilitate communications between the client(s) 1002 and the server(s) 1004. The client(s) 1002 are operably connected to one or more client data store(s) 1008 that can be employed to store information local to the client(s) 1002. Similarly, the server(s) 1004 are operably connected to one or more server data store(s) 1010 that can be employed to store information local to the servers 1004.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" are used in either the detailed description or the claims, such terms are intended to be inclusive in a manner similar to the term "comprising" as "comprising" is interpreted when employed as a transitional word in a claim.

What is claimed is:

1. A system for enhancing performance of a data pattern recognizer for an entity, the system comprising:
   one or more processors;
   a memory;
   a base parameter component that obtains a base set of parameters of the recognizer;
   a personalization component that updates the recognizer based at least in part upon at least one sample customized to the entity, the personalization component utilizes regularization favoring the base set of parameters of the recognizer during update of the recognizer;
   a regularization component that utilizes regularization to determine a new set of parameters for the recognizer; and
   a parameter update component that updates the base set of parameters of the recognizer to the new set of parameters,
   wherein one or more of the components comprise a set of processor-executable instructions stored in the memory and that, when executed by the one or more processors, perform its described operation.

2. The system of claim 1, the regularization component comprises:
   a deviation component that determines the deviation from the base set of parameters to a possible set of parameters;
   an error rate component that determines the error rate over the at least one customized sample using the possible set of parameters; and
   a minimization component that selects the new set of parameters to minimize the sum of the error rate and the deviation.

3. The system of claim 1, the base parameter component maintains the base set of parameters of the recognizer.

4. The system of claim 1, the base parameter component obtains the base set of parameters of the recognizer from the recognizer.

5. The system of claim 1, the recognizer classifies image data, the image data includes at least one of printed text and handwritten text.

6. The system of claim 1, further comprising:
   a sample receiving component that receives the at least one customized sample, the at least one customized sample includes raw data and a corresponding label.

7. The system of claim 6, the personalization component adds the corresponding label of the customized sample to a set of recognized labels of the recognizer.

8. The system of claim 1, the regularization utilized is Tichonov regularization.

9. A method for enhancing the performance of a trained recognizer for an individual, the method comprising:
   retraining, by one or more computing devices configured to enhance the performance of the trained recognizer for the individual, the trained recognizer based at least in part upon at least one sample personalized to the individual using regularization biased to a base state of the trained recognizer;
   determining a new state of the trained recognizer based upon the regularization and the at least one personalized sample; and
   updating the trained recognizer, the determining of the new state of the trained recognizer further comprises:
      determining a distance between the base state of the trained recognizer and a possible state of the trained recognizer;
      determining risk for the at least one personalized sample using the possible state of the trained recognizer; and
      minimizing the distance and the risk.

10. The method of claim 9, the at least one personalized sample includes image data, the image data includes at least one of printed text and handwritten text.

11. The method of claim 9, retraining the trained recognizer is based at least in part on a weight for the at least one personalized sample, the weight based in part on the likelihood of recognition error for the personalized sample.

12. The method of claim 9, further comprising maintaining the base state of the trained recognizer.

13. The method of claim 9, further comprising obtaining the base state of the trained recognizer from the trained recognizer.

14. A system for enhancing performance of a data-pattern recognizer for an individual, the system comprising:
   one or more processors;
   a memory;
   a personalization component that customizes the recognizer to the individual, the personalization being based at least in part upon a sample generated by the individual, the personalization component utilizes regularization biased to a base set of parameters of the recognizer;
   a base-parameter component that obtains the base set of parameters of the recognizer; and a regularization component that utilizes regularization to determine a new set of parameters for the recognizer based upon the regularization and the sample, wherein one or more of the components comprise a set of processor-executable instructions stored in the memory that, when executed by the one or more processors, perform its described operation.

15. The system of claim 14, further comprising a parameter-update component that updates the base set of parameters of the recognizer to the new set of parameters.

16. The system of claim 15, further comprising a base-parameter component that obtains the base set of parameters of the recognizer for the personalization component to customize the recognizer to the individual and maintains the base set of parameters once the base set of parameters are updated by the parameter-update component.

17. The system of claim 14, further comprising:
a deviation component that determines the deviation from the base set of parameters to a possible set of parameters;
an error-rate component that determines the error rate over the sample using the possible set of parameters; and
a minimization component that selects the new set of parameters to minimize the sum of the error rate and the deviation.

18. The system of claim 14, wherein the base set of parameters include a base set of weights of the recognizer and the new set of parameters include a new set of weights of the recognizer.

19. The system of claim 14, the recognizer classifies image data or audio data.

* * * * *